(12) United States Patent
Aybay et al.

(10) Patent No.: US 8,005,012 B1
(45) Date of Patent: Aug. 23, 2011

(54) TRAFFIC ANALYSIS OF DATA FLOWS

(75) Inventors: Gunes Aybay, Los Altos, CA (US); Jack Kohn, Mountain View, CA (US); David Rowell, Mountain View, CA (US); Fuguang Shi, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 244 days.

(21) Appl. No.: 12/363,482

(22) Filed: Jan. 30, 2009

(51) Int. Cl.
*G01R 31/08* (2006.01)

(52) U.S. Cl. .................. 370/253; 370/232; 370/252

(58) Field of Classification Search .............. None
See application file for complete search history.

(56) References Cited

U.S. PATENT DOCUMENTS

| | | | |
|---|---|---|---|
| 2007/0041331 A1* | 2/2007 | Ma et al. | 370/252 |
| 2007/0076606 A1* | 4/2007 | Olesinski et al. | 370/230 |
| 2007/0147246 A1* | 6/2007 | Hurley et al. | 370/232 |

* cited by examiner

*Primary Examiner* — Kwang B Yao
*Assistant Examiner* — Jutai Kao
(74) *Attorney, Agent, or Firm* — Harrity & Harrity, LLP

(57) ABSTRACT

A device includes a memory, flow table logic, sampling logic, and a processing unit. The memory is configured to store a flow table that stores, as a number of entries, statistics regarding a number of data flows. The flow table logic is configured to generate records corresponding to data flows for which entries are created in the flow table or removed from the flow table. The sampling logic is configured to select one of the data flows for sampling and sample initial data units for the one of the data flows. The processing unit is configured to receive the records generated by the flow table logic, receive the initial data units sampled by the sampling logic, analyze the initial data units to generate analysis results, correlate the records and the analysis results associated with a same one of the data flows, and store the correlated records and analysis results.

24 Claims, 12 Drawing Sheets

TRAFFIC ANALYSIS OF DATA FLOWS

BACKGROUND

There exists a class of systems that can analyze traffic flows in a network while traffic is being switched at full line rate. These systems include a traffic analyzer that is inserted between two networks. The traffic analyzer might be installed, for example, between a company's private network and a public network, such as the Internet. The traffic analyzer analyzes the traffic that crosses the boundaries of the two networks. This kind of traffic analyzer does not work for analyzing traffic within a network.

Also, existing traffic analyzers operate on some subset of the traffic, such as suspicious traffic. One issue with these traffic analyzers is that the traffic analyzers reduce throughput and increase latency in the network. Another issue with these traffic analyzers is that the subset of traffic that the traffic analyzers operate upon has to be identified beforehand. Unfortunately, it is not always possible to identify beforehand which traffic is of interest.

SUMMARY

According to one implementation, a device may include a memory, flow table logic, and a processing unit. The memory may store a flow table that stores, as a number of entries, statistics regarding a number of data flows. The flow table logic may generate flow creation records corresponding to new data flows for which entries are created in the flow table, generate flow termination records corresponding to terminated data flows for which entries exist in the flow table, and output the flow creation records and the flow termination records. The processing unit may receive the flow creation records and the flow termination records, correlate ones of the flow creation records and the flow termination records associated with a same one of the data flows, and store the correlated ones of the flow creation records and the flow termination records.

According to another implementation, a device may include a memory, flow table logic, sampling logic, and a processing unit. The memory may store a flow table that stores, as a number of entries, statistics regarding a number of data flows. The flow table logic may generate records corresponding to data flows for which entries are created in the flow table or removed from the flow table. The sampling logic may select one of the data flows for sampling and sample initial data units for the one of the data flows. The processing unit may receive the records generated by the flow table logic, receive the initial data units sampled by the sampling logic, analyze the initial data units to generate analysis results, correlate the records and the analysis results associated with a same one of the data flows, and store the correlated records and analysis results.

According to yet another implementation, a method, performed by a device that includes a memory device and a processing unit, may include receiving a data unit; identifying a data flow associated with the data unit; determining that the data flow is associated with no entry in a flow table stored within the memory device; creating an entry in the flow table for the data flow when there is no entry in the flow table that is associated with the data flow; generating a flow creation record, associated with the data flow, when the entry is created in the flow table; selecting the data flow for sampling; sampling initial data units associated with the data flow; sending the flow creation record and the initial data units to the processing unit; analyzing, by the processing unit, the initial data units to generate analysis results; and associating, by the processing unit, the flow creation record with the analysis results within the memory device.

According to a further implementation, a global analysis system may include a group of network devices connected to a global traffic analyzer. Each of the network devices may aggregate information regarding all data flows associated with data units received or transmitted by the network device without impacting throughput of the data units, and output the aggregated information. The global traffic analyzer may collect the aggregated information from each of the network devices, store the aggregated information, and present a user interface to facilitate searching and retrieval of information from the stored, aggregated information.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements.

Implementations, as described herein, may permit data flows to be analyzed within a network without affecting throughput or latency. For example, a network device, within the network, may collect statistics regarding data flows and sample data units associated with selected ones of these data flows. The term "data unit," as used herein, may refer to a packet, a datagram, or a cell; a fragment of a packet, a datagram, or a cell; or another type or arrangement of data. The term "data flow," as used herein, may refer to a collection of data units associated with communication between a particular source and a particular destination.

Exemplary Network

Figure 1:
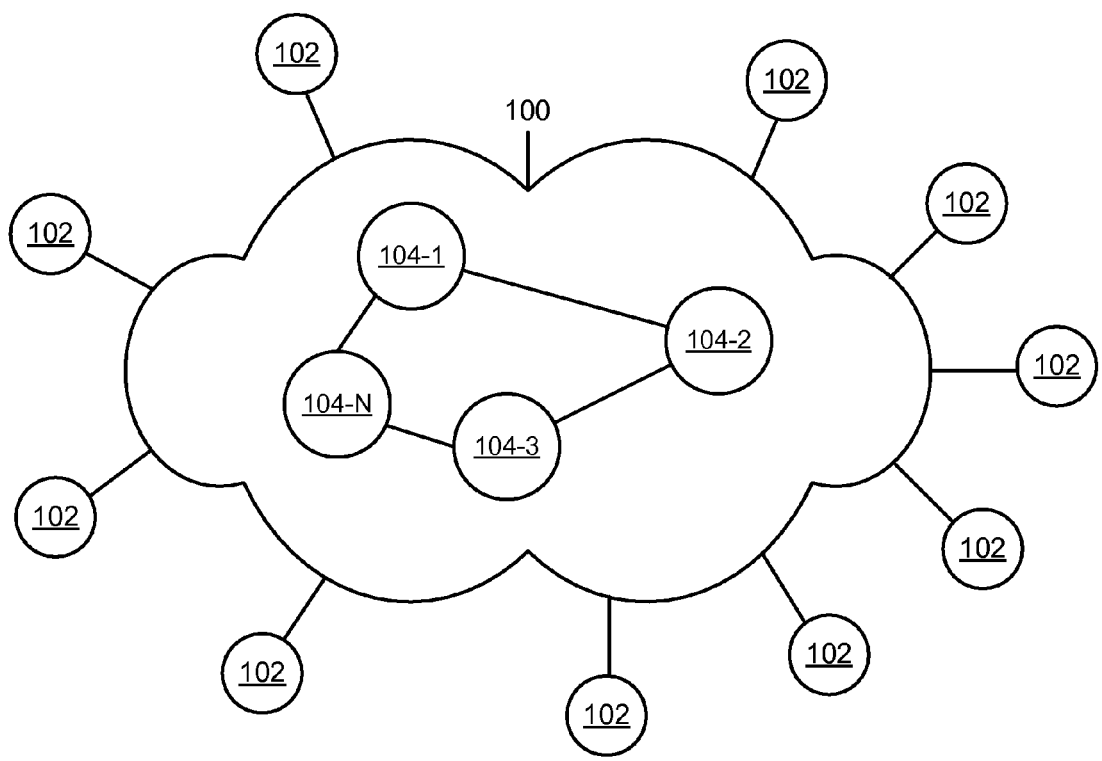
FIG. 1 is a diagram of an exemplary network in which systems and methods, described herein, may be implemented.

FIG. 1 is a diagram of an exemplary network 100 in which systems and methods, described herein, may be implemented. Network 100 may include any type of network, such as the Internet, an ad hoc network, a local area network (LAN), a wide area network (WAN), a metropolitan area network (MAN), a telephone network (e.g., the Public Switched Telephone Network (PSTN) or a cellular network), or a combination of networks. In one implementation, network 100 may take the form of a private network (e.g., a campus network).

As shown in FIG. 1, network 100 may include a number of endpoint devices 102 connected via a set of network devices 104-1, 104-2, . . . , 104-N (collectively referred to herein as "network devices 104," or generically as "network device 104") (N≧1). Endpoint devices 102 and/or network devices 104 may connect via wired and/or wireless connections. In another implementation, network 100 may include additional, fewer, different, or differently arranged devices than are shown in FIG. 1.

Each of endpoint devices 102 may include any type of communication or computational device, such as a personal computer, a workstation, a laptop, a server device, a mobile device (e.g., a personal digital assistant (PDA), a mobile telephone, etc.), or the like. In the description to follow, assume that various endpoint devices 102 communicate with other endpoint devices 102 via network 100.

Each of network devices 104 may include a switch, a router, a server, or another type of device. While network devices 104 can be implemented as different types of devices, in the following paragraphs, network devices 104 will be described in terms of a router, such as an aggregation router or a core router. The links interconnecting network devices 104 are shown by way of example. Network devices 104 may be interconnected via different links than those shown in FIG. 1.

Figure 2:
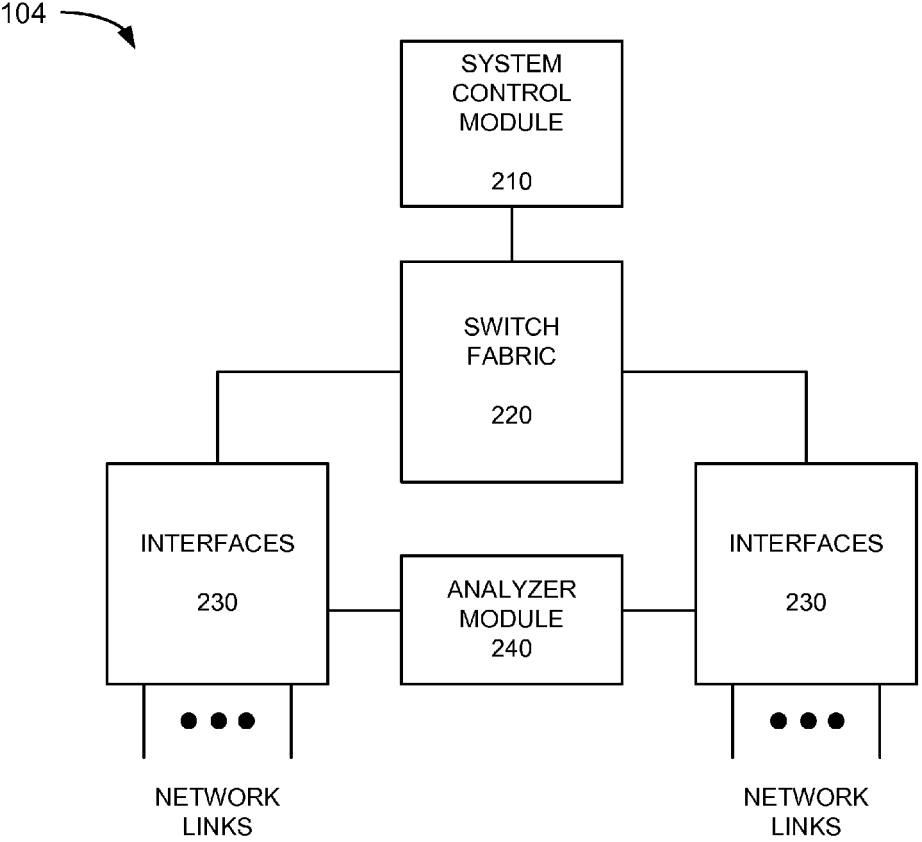
FIG. 2 is a block diagram illustrating exemplary components of a network device of FIG. 1.

FIG. 2 is a block diagram illustrating exemplary components of network device 104. As shown in FIG. 2, network device 104 may include a system control module 210, a switch fabric 220, a group of interfaces 230, and an analyzer module 240. In other implementations, network device 104 may include fewer, additional, different, or differently arranged components than those illustrated in FIG. 2. Also, or alternatively, one or more of the functions described as performed by one of the components may be performed by another one of the components. Also, or alternatively, a single component may be implemented as two or more separate components, or multiple components may be implemented as a single component.

System control module 210 may include, for example, a processor, a microprocessor, and/or processing logic (e.g., an application specific integrated circuit (ASIC), a field programming gate array (FPGA), etc.) that may be optimized for networking and communications. System control module 210 may perform high level management functions for network device 104. For example, system control module 210 may communicate with other networks and systems connected to network device 104 to exchange information regarding network topology. In some implementations, system control module 210 may include a routing engine for creating routing tables based on network topology information, creating forwarding tables based on the routing tables, and sending these tables to interfaces 230 for data unit routing. System control module 210 may also include a static memory (e.g. a read only memory (ROM)), a dynamic memory (e.g. a random access memory (RAM)), onboard cache, and/or flash memory for storing data and/or machine-readable instructions.

Switch fabric 220 may include one or more switching planes to facilitate communication among interfaces 230 and/or system control module 210. In one implementation, each of the switching planes may include a single or multi-stage switch of crossbar elements. Switch fabric 220 may also, or alternatively, include processors, memories, and/or paths that permit communication among system control module 210 and interfaces 230.

Interfaces 230 may include devices or assemblies, such as line cards, for receiving incoming data units from network links (or from other interfaces 230) and for transmitting the data units to network links (or to other interfaces 230). For example, interfaces 230 may include Ethernet interfaces, optical carrier (OC) interfaces, and/or asynchronous transfer mode (ATM) interfaces. Interfaces 230 may manage a set of input ports via which data units can be received and a set of output ports via which data units can be transmitted.

Analyzer module 240 may include a device that may analyze traffic received and/or transmitted by network device 104 with no performance impact (e.g., no latency impact). Analyzer module 240 may collect information regarding data flows, such as when data flows were created and/or terminated, how many data units and/or bytes were transmitted for these data flows, which endpoint devices 102 were the sources and/or destinations for the data flows, or the like.

Depending on the implementation, the components that are shown in FIG. 2 may provide fewer or additional functionalities. For example, if network device 104 performs an Internet Protocol (IP) data unit routing function as part of a Multi-Protocol Label Switching (MPLS) router, system control module 210 may perform tasks associated with obtaining routing information from other routers in a MPLS network. In such cases, conveying network traffic from one interface to another may involve label-based routing, rather than IP address-based routing.

Figure 3:
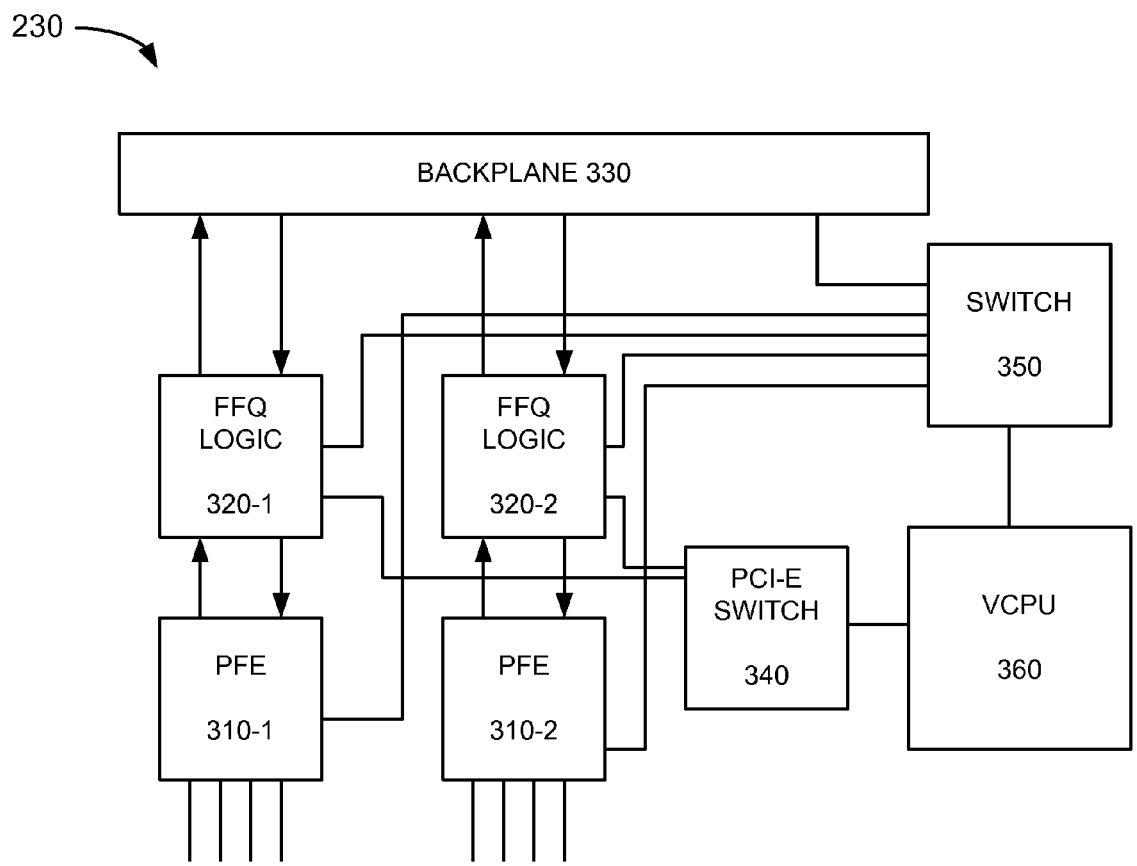
FIG. 3 is a block diagram illustrating exemplary components of an interface of FIG. 2.

FIG. 3 is a block diagram illustrating exemplary components of interface 230. As shown, interface 230 may include packet forwarding engines (PFEs) 310-1 and 310-2 (collectively referred to herein as "PFEs 310," or generically as "PFE 310"), flow management and fabric queuing (FFQ) logic 320-1 and 320-2 (collectively and generically referred to herein as "FFQ logic 320"), backplane 330, switch 340, switch 350, and Visibility Central Processing Unit (VCPU) 360. In different implementations, interface 230 may include fewer, additional, different, or differently arranged components than those illustrated in FIG. 3. Also, or alternatively, one or more of the functions described as performed by one of the components may be performed by another one of the components. Also, or alternatively, a single component may be implemented as two or more separate components, or multiple components may be implemented as a single component.

PFE 310 may each include hardware, or a combination of hardware and software, that may receive, store, process, and/or forward data units. PFE 310 may each include a memory to aid in the storing, processing, and/or forwarding of received data units. PFE 310 may process data units received from incoming network links and prepare data units for transmission on outgoing network links. PFE 310 may perform various look-ups (e.g., destination look-ups, access control look-ups, etc.) based on header information of the data units, and may make forwarding decisions based on these look-ups. PFE 310 may transmit received data units to FFQ logic 320.

PFE 310 may add a packet descriptor to a received data unit prior to sending the data unit to FFQ logic 320. The packet descriptor may include information regarding the look-ups and/or forwarding decisions made by PFE 310. In one implementation, PFE 310 may include a pointer, within the packet descriptor, that points to a location where Internet Protocol (IP) header fields begin within the header of the data unit. The IP header fields may include a source IP address field, a destination IP address field, a layer 3 (L3) protocol type field, a destination port field, and a source port field.

Figure 4:
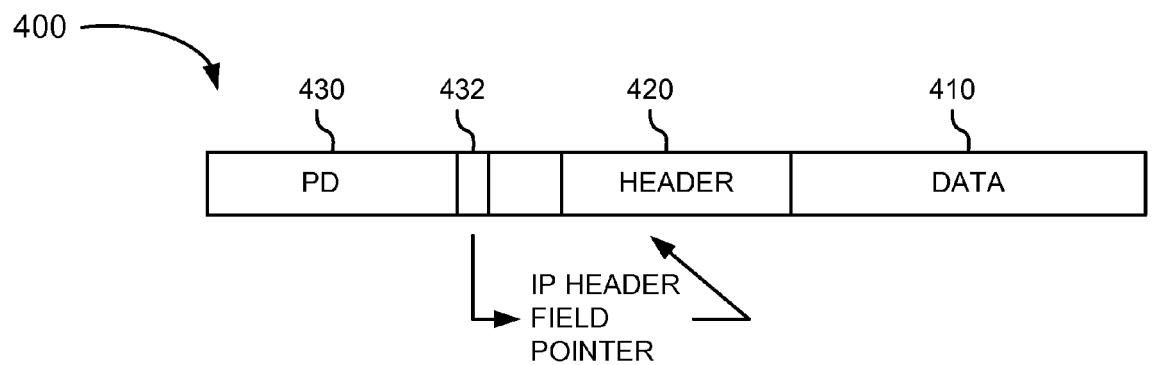
FIG. 4 is a diagram of an exemplary data unit that may be transmitted between components in the interface of FIG. 2.

FIG. 4 is a diagram of an exemplary data unit 400 that may be transmitted between PFE 310 and FFQ 320. Data unit 400 may include data portion 410, header portion 420, and packet descriptor (PD) portion 430. Data portion 410 may include the payload of the data unit received by PFE 310. Header portion 420 may include some or all of the header information of the data unit received by PFE 310. Packet descriptor portion 430 may include information regarding the look-ups and/or decisions made by PFE 310. In one implementation, packet descriptor portion 430 may include a pointer 432 that may point to a location in header portion 420 where the IP fields start. Pointer 432 may be stored in a particular location within packet description portion 430 that is known to FFQ logic 320 so that FFQ logic 320 knows where to locate pointer 432 and, thus, where to locate the IP fields in header portion 420.

Returning to FIG. 3, FFQ logic 320 may include hardware, or a combination of hardware and software, that may receive data units from PFEs 310 and monitor data flows associated with the data units. In one implementation, FFQ logic 320 may create a table entry for a data flow in a flow table and monitor flow statistics relating to the data flow. In one implementation, FFQ logic 320 may use a timer for each data flow to track the timing of data units for the data flow, and a set of counters for each data flow to track data unit/byte counts for the data flow. In some implementations, FFQ logic 320 may also sample data units and may send sampled data units and other information, such as flow table records, to switch 340 and/or switch 350. FFQ logic 320 may also transmit data units from PFE 310 to backplane 330.

Backplane 330 may include a switching fabric and/or one or more memories that may transmit data units to/from switch fabric 220 (as shown in FIG. 2). Switch 340 may include a high speed switching interface, such as a Peripheral Component Interconnect Express (PCI-E) switch, for transmitting/receiving data units and information between FFQ logic 320 and/or VCPU 360.

Switch 350 may include an Ethernet switch, or another type of switch, that may transmit data units and/or information among PFEs 310, FFQ logic 320, and/or VCPU 360. Switch 350 may also transmit and/or receive data units and/or information over an out-of-band plane, via backplane 330 to another device (internal or external to network device 104) for further processing and/or analysis.

VCPU 360 may include one or more processors, microprocessors, and/or processing logic (e.g., ASICs, FPGAs, etc.) that may perform network communications, management, and analysis functions. For example, VCPU 360 may control functions related to (local) operations between components shown in FIG. 3 and may control functions related to "visibility" of data units transmitted though interface 230. For example, VCPU 360 may accumulate records associated with a flow table and/or sampled data units. For example, VCPU 360 may receive a record, associated with a flow table entry, and/or sampled data units from FFQ logic 320. In one implementation, VCPU 360 may include temporary storage, such as RAM and/or flash memory, to temporarily store the records and/or sampled data units.

VCPU 360 may also transmit the records and/or sampled data units to an external device via switch 350. For example, VCPU 360 may receive flow table records and statistics from FFQ logic 320, aggregate and/or maintain the received flow table records and statistics, and export the aggregated flow table records and/or statistics to another component within network device 104 (e.g., analyzer module 240), or alternatively, to a device that is external to network device 104. VCPU 360 may aggregate flow table records and/or statistics based on various parameters, such as communication protocol, port number, source and/or destination addresses, source and/or destination address prefixes, source and/or destination autonomous system (AS) prefixes, etc. VCPU 360 may also perform management, accounting, or security processes, such as intrusion detection algorithms, analyses of successful to unsuccessful flows, etc.

Exemplary Functional Components of FFQ Logic

Figure 5:
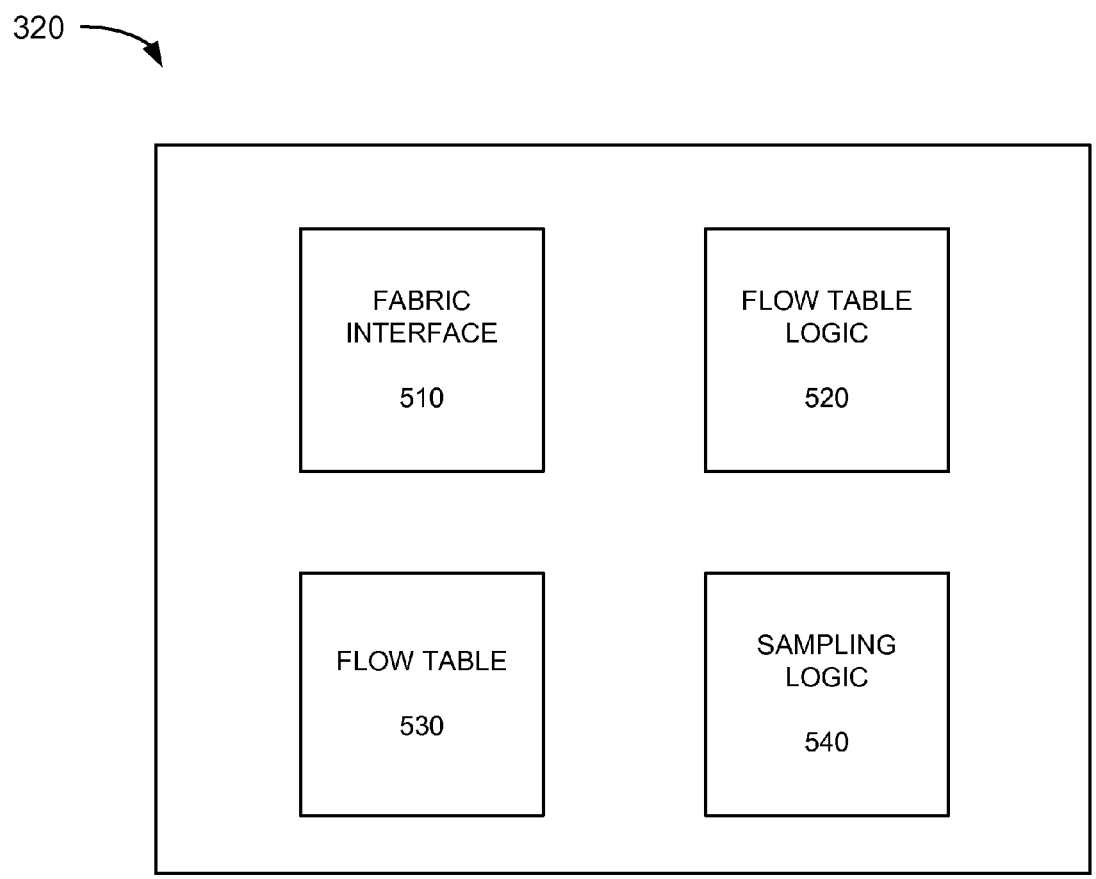
FIG. 5 is a block diagram illustrating exemplary functional components of flow management and fabric queuing logic of FIG. 3.

FIG. 5 is a block diagram illustrating exemplary functional components of FFQ logic 320. As shown in FIG. 5, FFQ logic 320 may include a fabric interface 510, flow table logic 520, a flow table 530, and sampling logic 540. In another implementation, FFQ logic 320 may include fewer, additional, different, or differently arranged functional components than those illustrated in FIG. 5. For example, in some implementations, one or more of the functional components of FIG. 5 may be located external to FFQ logic 320. Also, or alternatively, one or more of the functions described as performed by one of the functional components may be performed by another one of the functional components.

Fabric interface 510 may include hardware, or a combination of hardware and software, that may provide an interface to PFE 310, switch fabric 220, and/or another component of interface 230. Fabric interface 510 may include one or more interfacing queues or buffers (not shown) that may temporarily store data units that have been processed by flow table logic 520 and that await transmission from FFQ logic 320. In one implementation, fabric interface 510 may include a separate queue for each output port. Additionally, or alternatively, fabric interface 510 may include separate queues for different priority levels that may be assigned to the data units. Thus, fabric interface 510 may include separate queues per port and per priority. In other implementations, fabric interface 510 may include some other arrangement of queues.

Fabric interface 510 may also include an arbiter that selects data units for transmission from the queues. In one implementation, the arbiter may use a fair selection technique based on data unit priority and/or output port availability. For example, the arbiter may select the highest priority data unit destined for an output port that is available to receive the data unit.

Flow table logic 520 may include hardware, or hardware in combination with software, that may receive a data unit from PFE 310, determine a flow identifier from the data unit (e.g., read the flow identifier from the data unit or generate the flow identifier based on information in the data unit), provide information regarding the data unit and the flow identifier to create and/or update information regarding the data flow in flow table 530, and/or signal to sampling logic 540 whether to sample data units associated with the data flow.

In one implementation, flow table logic 520 may identify the flow identifier from information in the header of the data unit. For example, flow table logic 520 may construct the flow identifier from information in the data unit header that relates to information in the IP fields, such as the source IP address, the destination IP address, the source port, the destination port, and/or the L3 protocol type. In one implementation, the flow identifier may be calculated as a hash value of the information in the data unit header, and may be used to identify or create an entry in flow table 530. Flow table logic 520 may use pointer 432 in packet descriptor 430 to locate the IP fields in header portion 420 of the data unit.

Flow table logic 520 may, upon identification of the flow identifier associated with a data unit, determine if an entry corresponding to the flow identifier has been previously created in flow table 530. For example, flow table logic 520 may compare the flow identifier to information in flow table 530 to determine whether there is a match. If no entry exists, flow table logic 520 may create a corresponding entry in flow table 530 and signal sampling logic 540 to determine whether to sample data units corresponding to the data flow associated with the data unit. If, however, a corresponding entry had been previously created in flow table 530 (i.e., at least one prior data unit belonging to the data flow had been previously received by network device 104), flow table logic 520 may update one or more fields in the corresponding entry to reflect the newly received data unit.

Flow table 530 may be implemented within a memory device, such as one or more dynamic RAMs (DRAMs). Flow table 530 may include a number of entries corresponding to data flows identified by network device 104. For example, each entry in flow table 530 may include a flow identification field used to identify each data flow and other associated fields of information corresponding to a data flow (e.g., port or interface information, protocol information, etc.). Flow table 530 may include information regarding a large number of data flows, such as over one million data flows.

Figure 6:
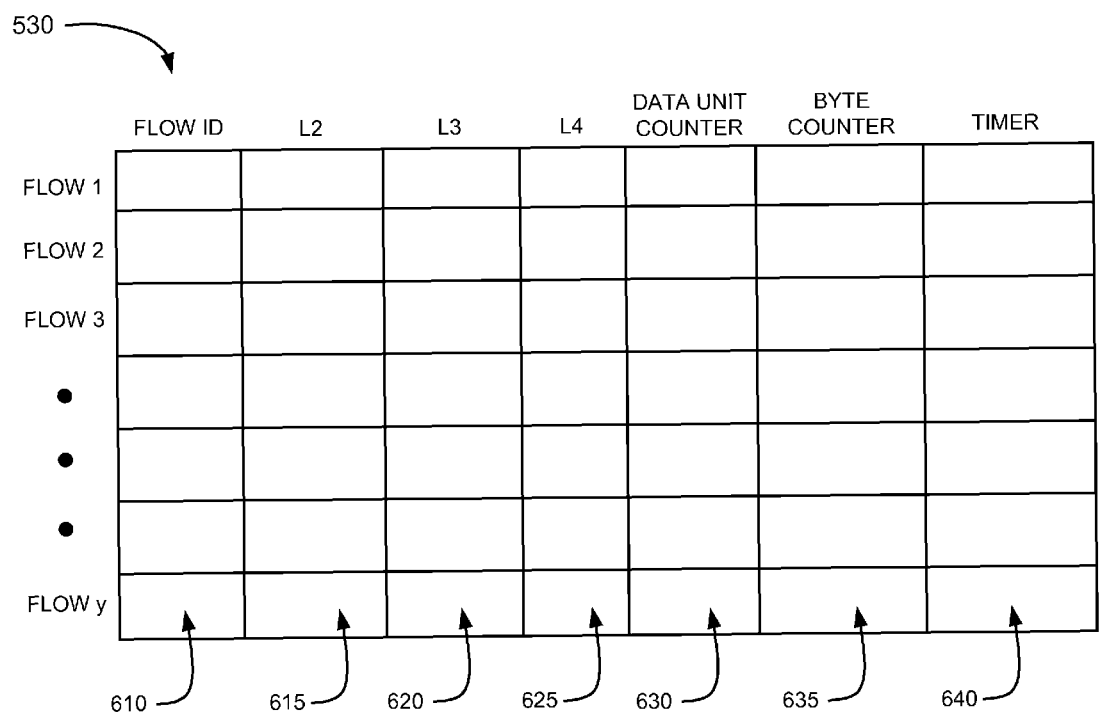
FIG. 6 is a diagram of exemplary fields of the flow table of FIG. 5.

FIG. 6 is a diagram of exemplary fields of flow table 530. As shown in FIG. 6, flow table 530 may include a number of flow table entries for each of data flows 1 through y. Exemplary entries in flow table 530 may include a flow identification (ID) field 610, a layer 2 (L2) information field 615, a layer 3 (L3) information field 620, a layer 4 (L4) information field 625, a data unit counter field 630, a byte counter field 635, and a timer field 640. In other implementations, an entry in flow table 530 may include additional, fewer, or different fields.

Flow identification field 610 may include a unique, or a substantially unique, flow identifier associated with a particular data flow. For example, a flow identifier may include a value derived from certain information in a header of a data unit corresponding to the data flow. For example, the flow identifier may be constructed from information in the data unit header, such as the source IP address, the destination IP address, the source port, the destination port, and/or the L3 protocol type. In one implementation, the flow identifier may be calculated as a hash value of the information in the data unit header. The flow identifier may provide an efficient way to identify and locate data flows in flow table 530.

L2 information field 615 may include elements of L2 information, such as a source media access control (MAC) address associated with the data unit, a destination MAC address associated with the data unit, Ethertype information, or another form of L2 data. L3 information field 620 may include elements of L3 information, such as source and destination IP addresses, an L3 protocol type (e.g., Transmission Control Protocol (TCP) or User Datagram Protocol (UDP)), or another form of L3 data. L4 information field 625 may include one or more elements of L4 information, such as source and destination port information (which sometimes designates an application type associated with a data unit), or another form of L4 data.

Data unit counter field 630 may include information for accumulating and/or indicating a total number of data units, corresponding to a data flow, that have been passed through interfaces 230 during a particular time period. Byte counter field 635 may include information for accumulating and/or indicating a total number of bytes that have been transferred in the data flow during the particular time period. Timer field 640 may include timing information, such as a timestamp, relating to data units received in the data flow. In one implementation, the timing information may include information regarding the time that the last data unit was received in the data flow. For example, each time that a data unit is received in a data flow, the information in timer field 640 may be updated with a new timestamp value.

In one embodiment, L2 information field 615 may include source and destination MAC addresses and/or Ethertype information, L3 information field 620 may include source and destination IP addresses and a L3 protocol type, and L4 information field 625 may include source and destination ports. The value of timer field 640, data unit counter field 630, and byte counter field 635 may be periodically reset or accumulated to provide a total count associated with a particular data flow.

Returning to FIG. 5, in an exemplary operation, flow table logic 520 may send certain information regarding entries in flow table 530 to VCPU 360 (FIG. 3). For example, when flow table logic 520 creates a new entry in flow table 530, flow table logic 520 may generate a flow creation record. In one implementation, a flow creation record may include information regarding the time that the entry is created in flow table 530, the header of the data unit, the packet descriptor associated with the data unit, and/or bookkeeping information (e.g., the flow identifier or other information that may be useful to the operations performed by VCPU 360). Flow table logic 520 may include (or have access to) a clock and use this clock to identify the time at which the entry is created.

Flow table logic 520 may periodically analyze the entries in flow table 530 to identify entries associated with terminated data flows. The term "terminated data flow" may refer to a data flow for which a data unit has not been received in a particular threshold amount of time. For example, flow table logic 520 may use the information in timer field 640 to identify entries associated with terminated data flows. When flow table logic 520 identifies a terminated data flow in flow table 530, flow table logic 520 may generate a flow termination record. In one implementation, a flow termination record may include information regarding the time of termination, the flow identifier associated with the data flow, and a packet and/or byte count from flow table 530. Flow table logic 520 may include (or have access to) a clock, use this clock to identify the time at which the termination event occurred, and use this time as the time of termination for the flow termination record. Alternatively, flow table logic 520 may track the time at which the last data unit was received in the data flow and use this information as the time of termination for the flow termination record.

Flow table logic 520 may send the flow creation and termination records to VCPU 360. In one implementation, flow table logic 520 may send the flow creation and termination records to VCPU 360 in batches of M records (where M>1). In another implementation, flow table logic 520 may send the flow creation and termination records to VCPU 360 as individual records.

Sampling logic 540 may include hardware, or hardware in combination with software, that may receive a signal from flow table logic 520 and determine whether to sample data units associated with a data flow. As explained above, flow table logic 520 may send a signal to sampling logic 540 each time that flow table logic 520 creates a new entry in flow table 530. In response to the signal from flow table logic 520, sampling logic 540 may execute some function to determine whether to sample data units associated with the data unit (for which a data flow entry has been created in flow table 530). In one implementation, the function may randomly select data flows to sample. In another implementation, the function may select data flows to sample based on an attribute of the data flows, such as the sources (or subnets) from which the data flows originate, the protocol type associated with the data flows, or some other data flow attribute. For example, the function may assign weights to data flows. In this implementation, the function may assign higher weights to a particular class of data flows (e.g., data flows associated with particular sources (or subnets)) than weights assigned to another class of data flows (e.g., associated with other sources (or subnets)). The function may then determine whether to sample a data flow based on the assigned weights.

If sampling logic 540 identifies a data flow to sample, sampling logic 540 may sample the initial X data units associated with the data flow (X≧1). The term "initial data units" may refer to the first data units transmitted for the data flow. The initial data units of a data flow carry the most useful information regarding the data flow. As a result, sampling logic 540 may make a copy the initial X data units and send these data units to analyzer module 240 for deep inspection.

Exemplary Components of Analyzer Module

Figure 7:
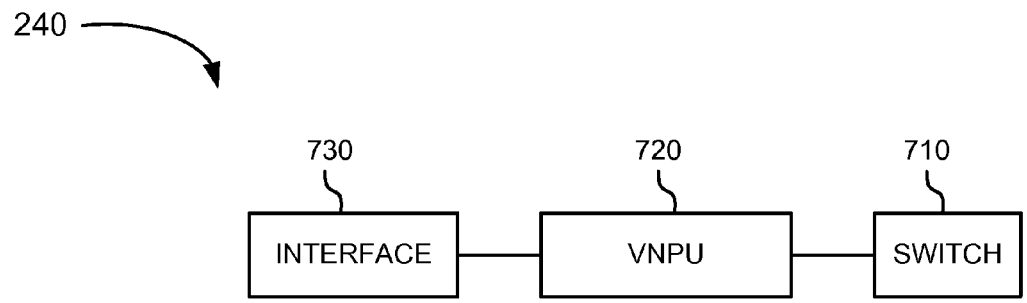
FIG. 7 is a diagram of exemplary components of the analyzer module of FIG. 2.

FIG. 7 is a block diagram illustrating exemplary components of analyzer module 240. As shown in FIG. 7, analyzer module 240 may include a switch 710, a Visibility Network Processing Unit (VNPU) 720, and an interface 730. In another implementation, analyzer module 240 may include fewer, additional, different, or differently arranged components than those illustrated in FIG. 7. For example, in some implementations, one or more of the components of FIG. 7 may be located external to analyzer module 240. Also, or alternatively, one or more of the functions described as performed by one of the components may be performed by another one of the components.

Switch 710 may include an Ethernet switch, or another type of switch, that may receive data units and/or other information from switch 350 of one or more interfaces 230. VNPU 720 may include one or more processors, microprocessors, and/or processing logic (e.g., ASICs, FPGAs, etc.) that may perform network communications, management, and analysis functions. For example, VNPU 720 may perform deep inspection (e.g., deep packet inspection) on sampled data units. VNPU 720 may accumulate flow creation and termination records from multiple interfaces 230. VNPU 720 may include long term storage to store the sampled data units and the accumulated records.

VNPU 720 may match related information associated with a same data flow even when data units associated with the data flow are received and transmitted via different interfaces 230. In this case, certain header information in the data units may remain the same (e.g., source and destination IP addresses, source and destination ports, and L3 protocol type)—though some of the information may occur in different fields (e.g., the source IP address in one direction may be the destination IP address in the other direction, and vice versa). In one implementation, VNPU 720 may send analysis results and/or accumulated information to a device that is external to network device 104. Interface 730 may include a switch, such as an Ethernet switch, that may receive the analysis results and/or the accumulated information and send the information to the external device.

Communication Planes

Figure 8:
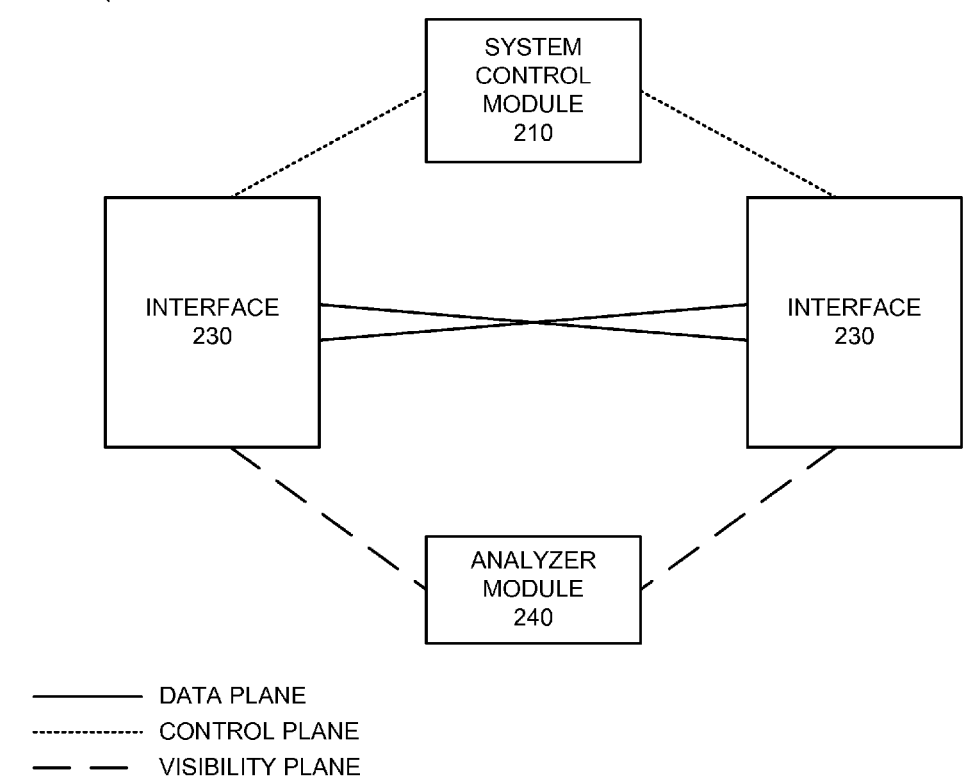
FIG. 8 is a diagram illustrating exemplary communication planes in the network device of FIG. 2.

FIG. 8 is a diagram illustrating exemplary communication planes in network device 104. As shown in FIG. 8, network device 104 may include multiple communication planes: a data plane, a control plane, and a visibility plane. Data communication may occur between interfaces 230 via the data plane. For example, interface 230 may transfer a data unit to another interface 230 via the data plane. In one implementation, the communication on the data plane may occur via switch fabric 220.

Control messages may be communicated between interfaces 230 and system control module 210 via the control plane. For example, system control module 210 and interfaces 230 may exchange exception and protocol messages, network statistics, and/or other types of control messages via the control plane. In one implementation, the communication on the control plane may occur via dedicated connections within network device 104.

Visibility information (e.g., information relating to data flow monitoring) may be communicated between interfaces 230 and analyzer module 240 via the visibility plane. The visibility plane may be dedicated to the task of distilling information from flow table 530, collecting the information, storing the information, and presenting the information. For example, interfaces 230 may send information regarding data flow creation and/or termination, sampled data units, etc. to analyzer module 240 via the visibility plane. In one implementation, the communication on the visibility plane may occur via dedicated connections within network device 104, such as via Ethernet connections.

Figure 9:
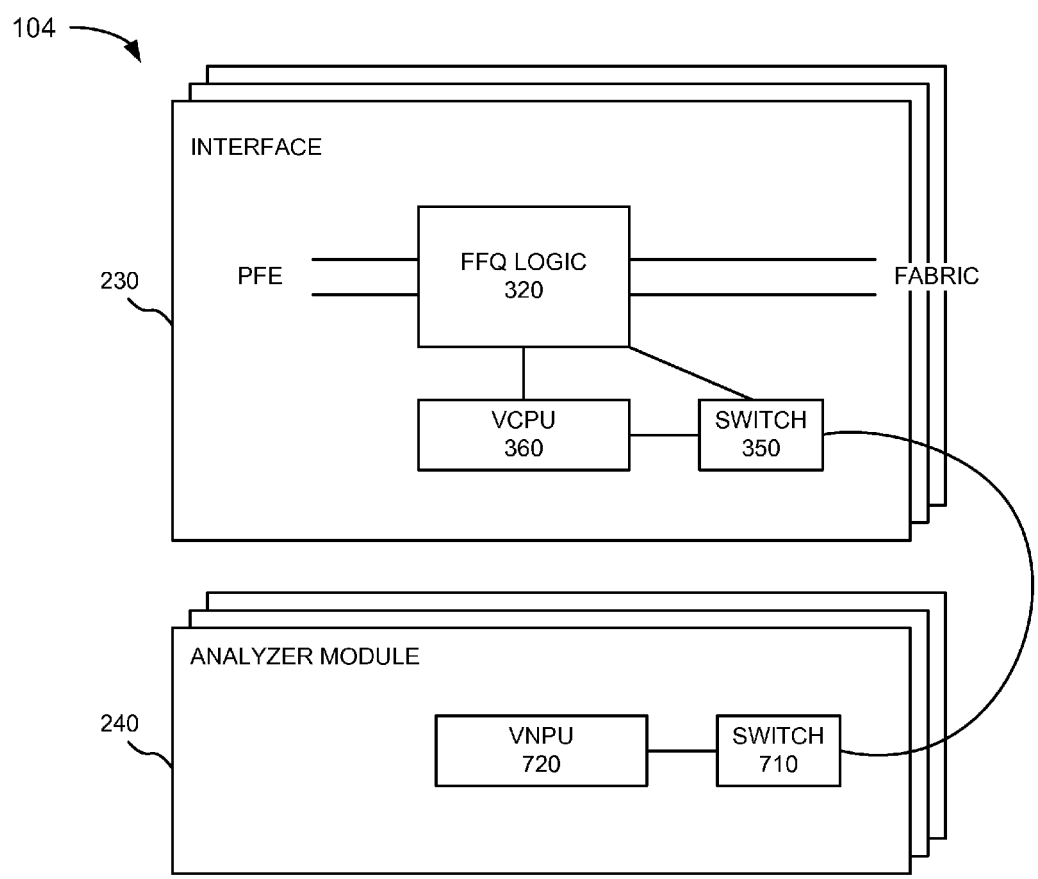
FIG. 9 is a diagram illustrating exemplary components, of the network device of FIG. 2, that may participate in communication on a visibility plane.

FIG. 9 is a diagram illustrating exemplary components, of network device 104, that may participate in communication on the visibility plane. As shown in FIG. 9, multiple interfaces 230 may connect to one or more analyzer modules 240. Each analyzer module 240 may connect to one or more interfaces 230. To facilitate communication between interface 230 and analyzer module 240 on the visibility plane, switch 350, of interface 230, may connect to switch 710, of analyzer module 240. In one implementation, the connection between switch 350 and switch 710 may include an Ethernet connection.

Exemplary Processes

FIGS. 10-14 illustrate flowcharts of exemplary processes for monitoring, processing, and/or sampling data unit(s) of a data flow. The processes illustrated in FIGS. 10-14 may be performed by FFQ logic 320, VCPU 360, VNPU 720, and/or another component separate from or in conjunction with FFQ logic 320, VCPU 360, and/or VNPU 720.

Figure 10:
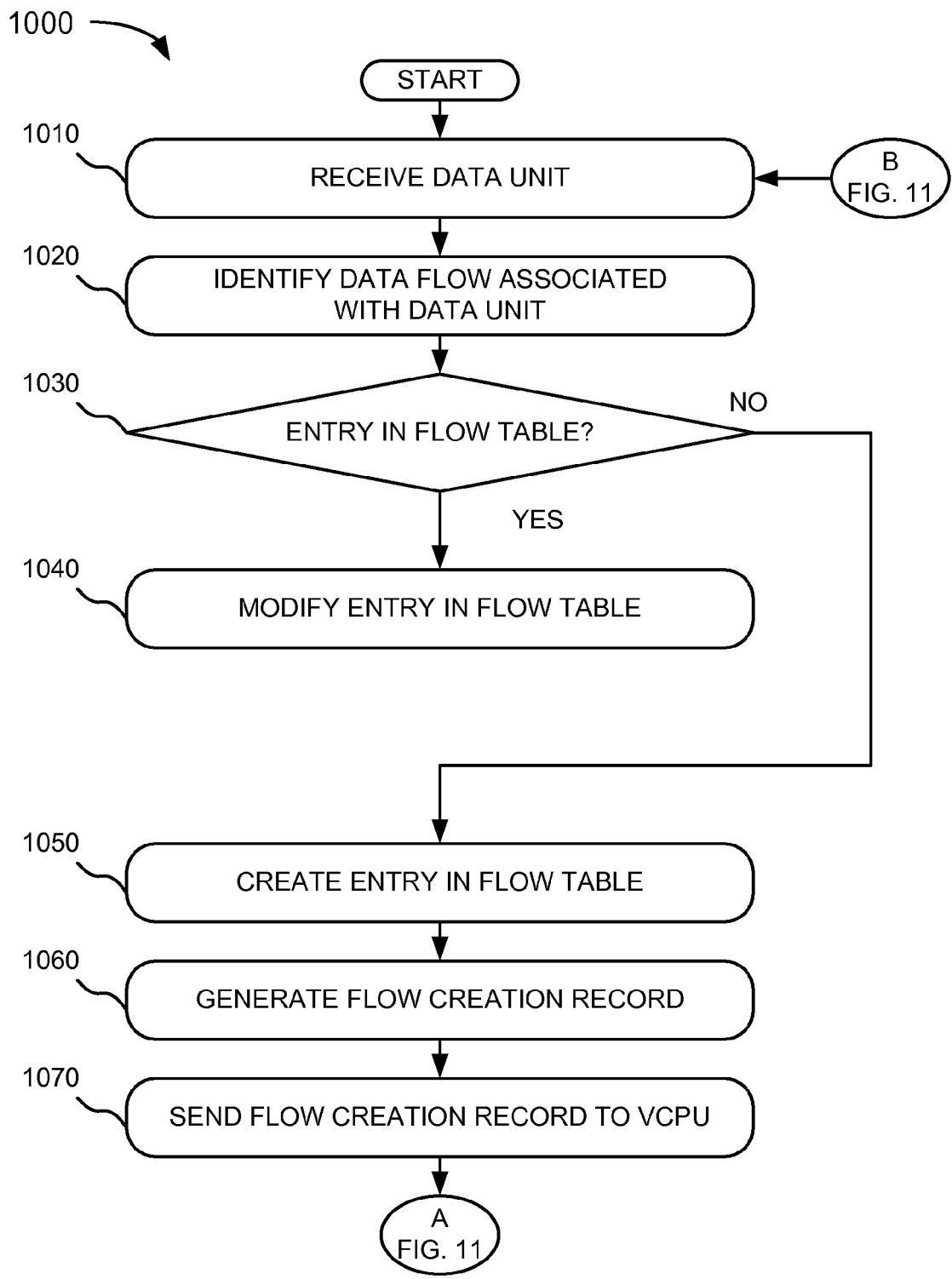
FIGS. 10-14 illustrate flowcharts of exemplary processes for monitoring, processing, and/or sampling data unit(s) of a data flow.
Figure 11:
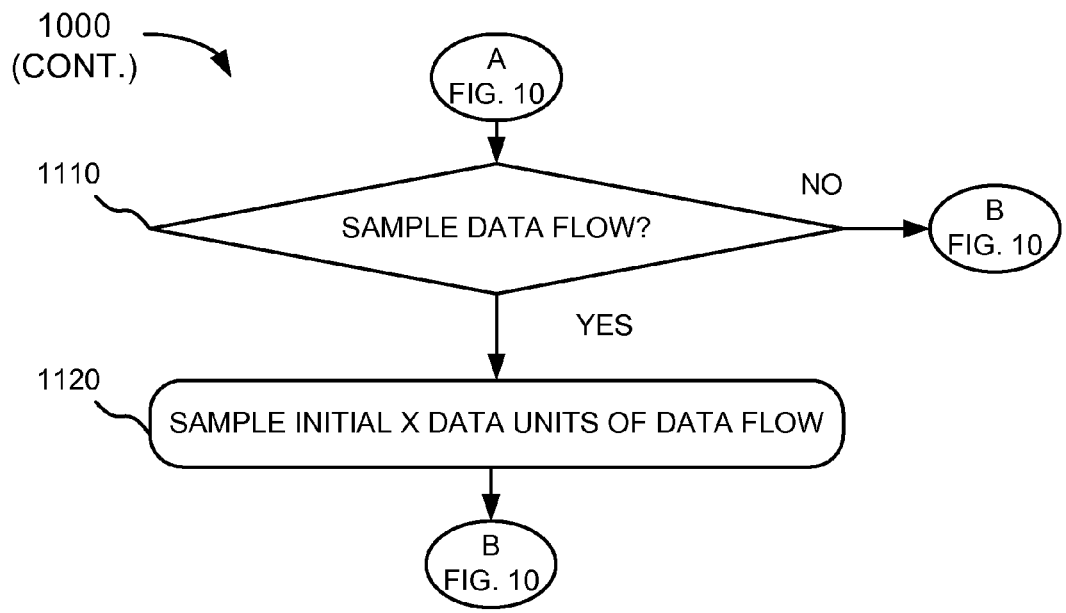

FIGS. 10 and 11 illustrate flowcharts of an exemplary process 1000 for processing a data unit. Process 1000 may begin with a data unit being received (block 1010) (FIG. 10). For example, FFQ logic 320 may receive a data unit from PFE 310. As explained above, the data unit may include a data portion 410, a header portion 420, and a packet descriptor portion 430 (FIG. 4).

The data flow associated with the data unit may be identified (block 1020). For example, flow table logic 520 may determine a flow identifier from the data unit (e.g., read the flow identifier from the data unit or generate the flow identifier from information in the data unit). As described above, flow table logic 520 may identify the flow identifier from information in the header of the data unit, such as the source IP address, the destination IP address, the source port, the destination port, and/or the L3 protocol type. In one implementation, the flow identifier may be calculated as a hash value of the information in the data unit header. Flow table logic 520 may identify the information to use to generate the flow identifier based on pointer 432 in packet descriptor portion 430.

It may be determined whether an entry, for the data flow, already exists in flow table 530 (block 1030). For example, flow table logic 520 may search flow table 530, using the flow identifier, to determine whether flow table 530 includes an entry with a matching flow identifier in, for example, flow identification field 610. If flow table 530 includes an entry with a matching flow identifier, this may mean that an entry for the data flow has already been created. If flow table 530 does not include an entry with a matching flow identifier, this may mean that an entry for the data flow does not exist.

If flow table 530 already includes an entry for the data flow (block 1030—YES), the entry in flow table 530 may be modified (block 1040). For example, flow table logic 520 may update information in the entry of flow table 530. In one implementation, flow table logic 520 may update flow statistics, such as the data count in data unit counter field 630, the byte count in byte counter field 635, and/or timing information in timer field 640 of flow table 530.

If flow table 530 does not include an entry for the data flow (block 1030—NO), an entry may be created in flow table 530 (block 1050). For example, flow table logic 520 may store various information, such as the information described above with regard to FIG. 6, in an entry of flow table 530.

A flow creation record may be generated (block 1060). For example, flow table logic 520 may generate a flow creation record that includes the time that the data flow entry was created in flow table 530, all or a subset of header portion 420 of the data unit, packet descriptor portion 430 of the data unit, and/or bookkeeping information, such as the flow identifier.

The flow creation record may be sent to VCPU 360 (block 1070). For example, flow table logic 520 may send the flow creation record to VCPU 360 when the flow creation record is generated. In another implementation, flow table logic 520 may send flow creation records to VCPU 360 in batch (e.g., M flow creation records at a time). In yet another implementation, flow table logic 520 may send flow creation records in batch with flow termination records to VCPU 360.

It may be determined whether to sample data units associated with the data flow (block 1110) (FIG. 11). For example, flow table logic 520 may send a signal to sampling logic 540 to indicate, to sampling logic 540, that a new data flow has been received. Sampling logic 540 may execute a function that determines whether to select a data flow for sampling. In one implementation, sampling logic 540 may execute a random function that selects a particular percentage of all data flows for sampling. In another implementation, sampling logic 540 may execute a function that assigns weights to data flows based on an attribute of the data flows. For example, certain data flows (e.g., data flows associated with particular sources and/or subnets) may be assigned higher weights than other data flows (e.g., data flows associated with other sources and/or subnets). Sampling logic 540 may then select a data flow for sampling based on the weights assigned to the data flows. Alternatively, or additionally, certain data flows may be eliminated altogether from consideration for sampling (e.g., certain data flows may be known not to include information of interest).

If the data flow is not be sampled (block 1110—NO), then process 1000 may continue at block 1010 where a next data unit is received. If the data flow is to be sampled (block 1110—YES), then the initial X data units of the data flow may be sampled (block 1120). For example, sampling logic 540 may mark the data flow for sampling, and make a copy of the initial X data units associated with the data flow (as the data units are received) and send these data unit copies to VNPU 720. In one implementation, sampling logic 540 may send the data unit copies directly to VNPU 720 via switches 350 and 710. In another implementation, sampling logic 540 may send the data unit copies to VNPU 720 via VCPU 360 and switches 350 and 710. Process 1000 may continue at block 1010 where a next data unit is received.

Figure 12:
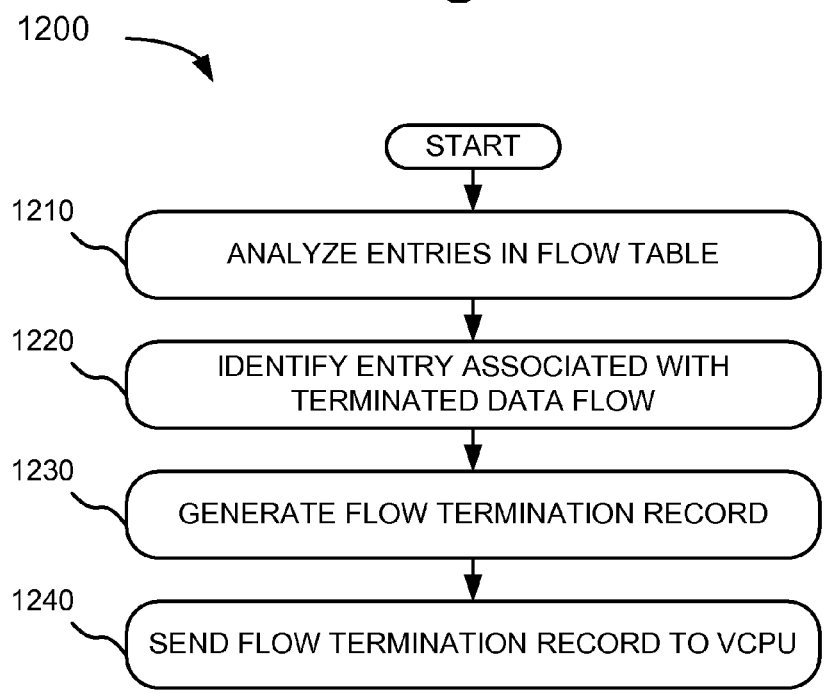

FIG. 12 illustrates a flowchart of an exemplary process 1200 for generating a flow termination record. Process 1200 may begin with an analysis of the entries in flow table 530 (block 1210). For example, flow table logic 520 may periodically analyze the contents of flow table 530 to identify entries corresponding to active data flows (e.g., data flows for which data units have been received within a threshold amount of time) and terminated data flows (e.g., data flows for which no data units have been received for at least the threshold amount of time).

An entry, associated with a terminated data flow, may be identified (block 1220). For example, flow table logic 520 may analyze the information in, for example, timer field 640 of flow table 530 to determine that at least the threshold amount of time has passed since the last data unit was received in the data flow. Since the data flow is considered terminated, the entry may be removed from flow table 530 or marked for removal by a garbage collection process.

A flow termination record may be generated (block 1230). For example, flow table logic 520 may generate a flow termination record that includes the time that the data flow was terminated, the flow identifier from flow identification field 610, the data unit count value in data unit counter field 630, and/or the byte count value in byte counter field 635. As explained above, flow table logic 520 may use information regarding when the timeout event occurred or information regarding when the last data unit was received for the data flow as the time that the data flow was terminated.

The flow termination record may be sent to VCPU 360 (block 1240). For example, flow table logic 520 may send the flow termination record to VCPU 360 when the flow termination record is generated. In another implementation, flow table logic 520 may send flow termination records to VCPU 360 in batch (e.g., M flow termination records at a time). In yet another implementation, flow table logic 520 may send flow termination records in batch with flow creation records to VCPU 360.

Figure 13:
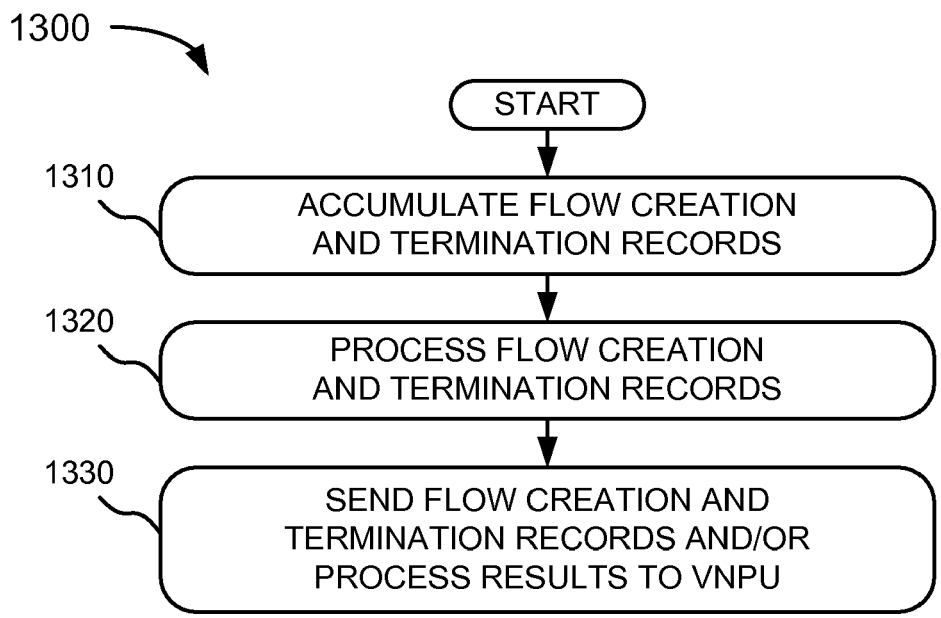

FIG. 13 illustrates a flowchart of a process 1300 for processing flow creation and termination records. Process 1300 may begin with the accumulation of flow creation and termination records (block 1310). For example, as explained above, flow table logic 520 may send flow creation and termination records to VCPU 360. VCPU 360 may receive the flow creation and termination records and store the records in temporary storage.

The flow creation and termination records may be processed (block 1320). For example, VCPU 360 may correlate flow creation and termination records associated with a same data flow. For example, even though data units, corresponding to the same data flow, may transit different interfaces 230 in different directions, information regarding these data units may be correlated since header portion 420 of the data units carry the same information (though perhaps in a different order).

Through this aggregation and correlation of flow creation and termination records, VCPU 360 may create a history of which data flows existed at any particular point in time, determine when the data flows were created, determine when the data flows were terminated, identify the sources and destinations associated with the data flows, determine how many data units/bytes were sent on the data flows, determine how many active data flows existed at a particular point in time, determine what the flow creation rate is for a particular source, determine what the amount of bandwidth and/or data units is for aggregate data flows (e.g., data flows associated with applications running on a same server), etc. A benefit of this is that there is no need to decide beforehand what data flows are of interest. Information is collected and stored, in flow table 530, for all data flows. This information may be parsed and analyzed in many different ways for reasons relating to security, management, accounting, or other reasons.

VCPU 360 may also perform security and/or network functions. For example, VCPU 360 may determine whether a particular source (e.g., a particular endpoint device 102) is responsible for the creation of more than a particular quantity of data flows during a period of time, which might be a sign of an attack or a misconfiguration in the network. In another implementation, VCPU 360 may determine the ratio of the number of successful data flows to the number of unsuccessful data flows associated with a particular source. Whether establishment of a data flow is successful or unsuccessful may be determined, for example, by monitoring the initial data units exchanged between a source and a destination (e.g., the transmission control protocol (TCP) messages exchanged in a three-way handshake). It might be useful for flow table logic 520 to track successful and unsuccessful data flows in flow table 530. In this case, flow table 530 may include an additional field that indicates whether a data flow was successfully or unsuccessfully established. Flow table logic 520 may send information regarding successful and unsuccessful data flows to VCPU 360 as part of the flow creation or termination records. Such a technique is different from existing solutions that are based on the detection of signatures. A problem with detecting signatures is that the signatures have to be known beforehand. This is not an issue when monitoring data flows that are successfully and unsuccessfully established.

The flow creation and termination records and/or the process results (i.e., the results from block 1320) may be sent to VNPU 720 (block 1330). For example, VCPU 360 may periodically send flow creation and termination records to VNPU 720. Alternatively, or additionally, VCPU 360 may also send the process results, from block 1320, to VNPU 720. VCPU 360 may send the flow creation and termination records and/or the process results to VNPU 720 via switches 350 and 710.

Figure 14:
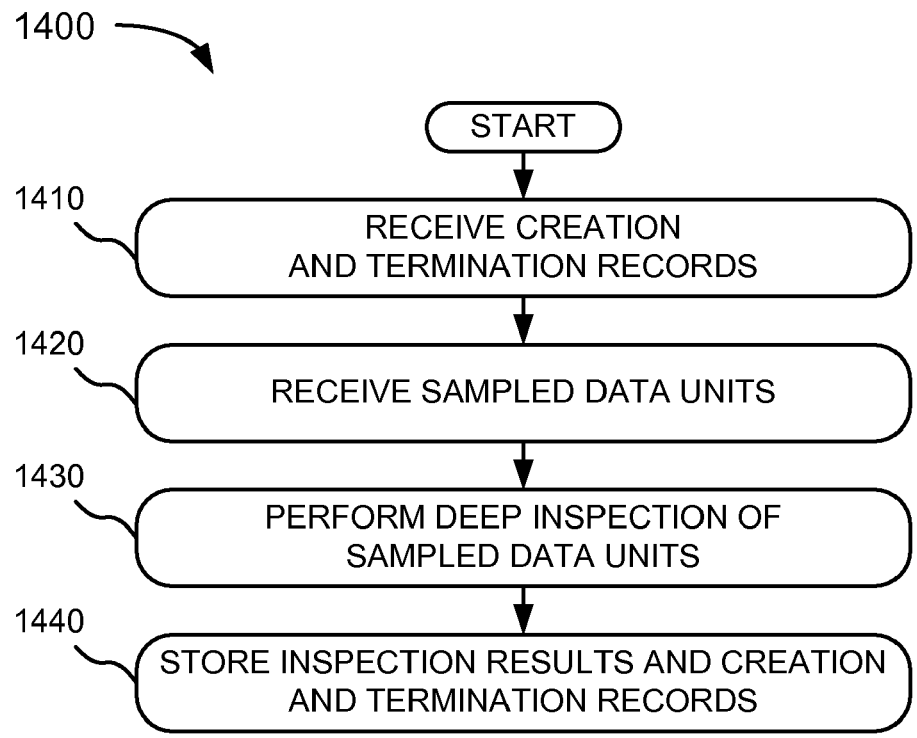

FIG. 14 illustrates a flowchart a process 1400 for processing flow creation and termination records and sampled data units. Process 1400 may begin with the reception of flow creation and termination records (block 1410). For example, as explained above, VCPU 360 may accumulate flow creation and termination records. VCPU 360 may periodically send the flow creation and termination records to VNPU 720 via switches 350 and 710.

Sampled data units may be received (block 1420). As explained above, sampling logic 540, of FFQ logic 320, may select data flows for sampling and sample the initial X data units associated with the selected data flows. Sampling logic 540 may send the sampled data units to VNPU 720 via switches 350 and 710.

Deep inspection of the sampled data units may be performed (block 1430). For example, VNPU 720 may perform a deep inspection of the sampled data units. Deep inspection may reveal certain information about a data flow, such as the identity of an application involved in the data flow. Prior techniques used port number information to identify an application involved in a data flow. Port number information is no longer reliable, however, because standard ports may carry all kinds of traffic, including traffic that is unrelated to the traffic that conventionally has been transmitted to these ports. Deep inspection may alleviate this issue.

The inspection results and the creation and termination records may be stored (block 1440). For example, VNPU 720 may store this information in long-term storage. VNPU 720 may make this information available for later analysis. In one implementation, VNPU 720 may correlate information associated with data units corresponding to the same data flow. For example, even though data units, corresponding to the same data flow, may transit different interfaces 230 in different directions, information regarding these data units may be correlated since header portion 420 of the data units carry the same information (though perhaps in a different order).

Global Traffic Analysis

Figure 15:
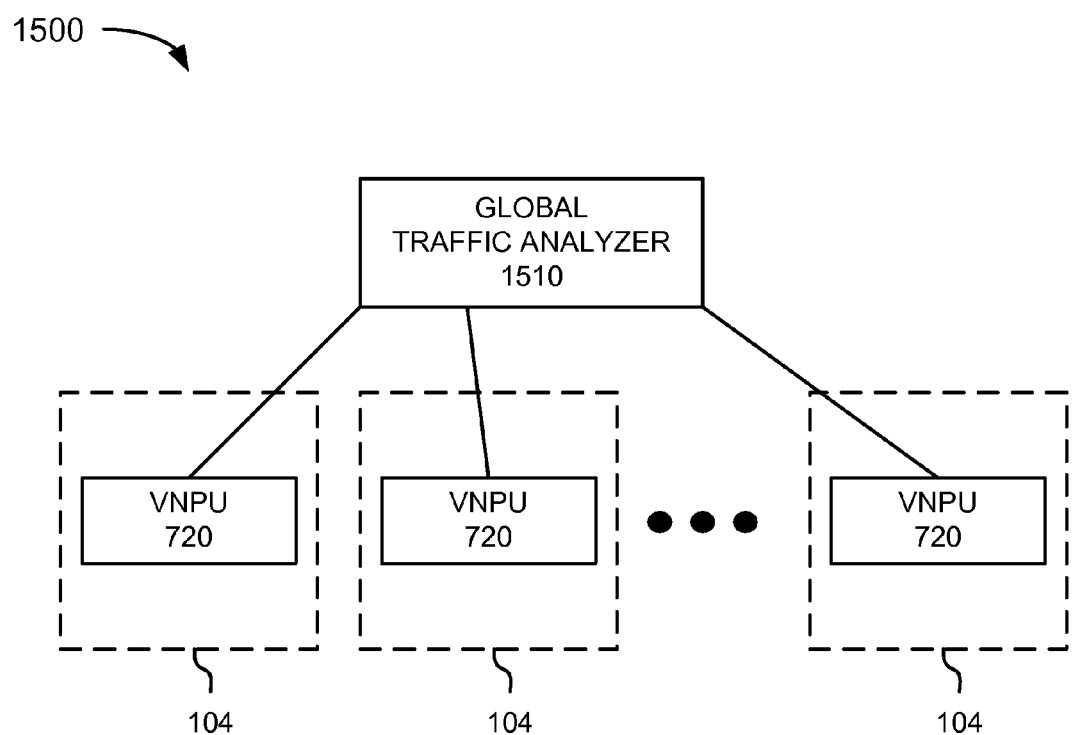
FIG. 15 is a diagram of an exemplary global traffic analysis system.

FIG. 15 is a diagram of an exemplary global traffic analysis system 1500. As shown in FIG. 15, global traffic analysis system 1500 may include a global traffic analyzer 1510 connected to multiple VNPUs 720. Each VNPU 720 may be associated with the same network device 104 or a different network device 104. VNPUs 720 may connect to global traffic analyzer 1510 via interface 730 (FIG. 7).

Global traffic analyzer 1510 may aggregate information from VNPUs 720. Global traffic analyzer 1510 may correlate information associated with data units corresponding to the same data flow. For example, even though data units, corresponding to the same data flow, may transit different network devices 104 in different directions, information regarding these data units may be correlated since header portion 420 of the data units carry the same information (though perhaps in a different order).

Global traffic analyzer 1510 may present a user interface to an operator to permit the operator to submit queries for information of interest. In response to a query, global traffic analyzer 1510 may search the information, that global traffic analyzer 1510 aggregated from VNPUs 720, to identify information that satisfies the query.

Global traffic analyzer 1510 may also include a report generator that may generate various reports in which the operator may be interested. For example, the operator may input certain criteria, associated with information in which the operator is interested, and global traffic analyzer 1510 may generate and present a report that satisfies the operator's criteria.

CONCLUSION

Implementations, described herein, may analyze all traffic received by a network device with no performance impact and no increase in latency. As described above, data, regarding all data flows received by the network device, is stored in a flow table without impacting the throughput of the network device. Implementations, described herein, may provide mechanisms for parsing the vast amount of data in the flow table. For example, information, regarding new data flows and terminated data flows, may be sent to a processing unit for analysis. Also, certain data flows may be selected for sampling, and the initial data units, associated with the selected data flows, may be copied and sent to the processing unit for analysis. Information from multiple interfaces and/or network devices may be accumulated and stored in a searchable format. Thus, a network operator may easily obtain information relating to management, accounting, security, or other matters of interest.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 10-14, the order of the blocks may be modified in other implementations. Further, non-dependent blocks may be performed in parallel.

Also, certain portions of the implementations have been described as "logic" or a "component" that performs one or more functions. The terms "logic" or "component" may include hardware, such as a processor, an ASIC, or a FPGA, or a combination of hardware and software (e.g., software running on a processor).

Further, a flow table has been described. The term "table," as used herein, may refer to any searchable form or arrangement of data within a memory.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A device, comprising:
   a memory configured to store a flow table that stores, as a plurality of entries, statistics regarding a plurality of data flows;
   flow table logic configured to:
      generate flow creation records corresponding to new data flows for which entries are created in the flow table,
      generate flow termination records corresponding to terminated data flows for which entries exist in the flow table, and
      output the flow creation records and the flow termination records; and
   a processing unit configured to:
      receive the flow creation records and the flow termination records,
      correlate ones of the flow creation records and the flow termination records associated with a same one of the plurality of data flows,
      store the correlated ones of the flow creation records and the flow termination records, and
      determine, based on the correlated ones of the flow creation records and the flow termination records, a number of successful and a number of unsuccessful attempts to establish data flows by a particular source.

2. The device of claim 1, where the flow table logic is further configured to:
   receive a data unit associated with a particular data flow,
   determine that none of the plurality of entries, in the flow table, corresponds to the particular data flow, and
   create an entry in the flow table, corresponding to the particular data flow, when none of the plurality of entries corresponds to the particular data flow.

3. The device of claim 2, where, when generating the flow creation records, the flow table logic is configured to generate one of the flow creation records, corresponding to the particular data flow, when the entry, corresponding to the particular data flow, is created in the flow table.

4. The device of claim 2, further comprising:
   sampling logic configured to:
      randomly select the particular data flow for sampling, and
      sample a plurality of initial data units for the particular data flow when the particular data flow is selected for sampling.

5. The device of claim 2, further comprising:
   sampling logic configured to:
      assign a weight value to the particular data flow based on an attribute associated with the particular data flow,
      select the particular data flow for sampling based on the assigned weight value, and
      sample a plurality of data units for the particular data flow when the particular data flow is selected for sampling.

6. The device of claim 1, further comprising:
   sampling logic configured to:
      select a particular data flow for sampling, and
      sample a plurality of initial data units for the particular data flow when the particular data flow is selected for sampling.

7. The device of claim 6, further comprising:
   another processing unit configured to:
      receive the initial data units from the sampling logic, and
      perform deep packet inspection on the initial data units.

8. The device of claim 1, further comprising:
   sampling logic configured to:
      assign a weight value to the particular data flow based on an attribute associated with the particular data flow,
      select the particular data flow for sampling based on the assigned weight value, and
      sample a plurality of initial data units for the particular data flow when the particular data flow is selected for sampling.

9. The device of claim 1, where, when outputting the flow creation records and the flow termination records, the flow table logic is configured to send, to the processing unit, a collection of a plurality of the flow creation records, a collection of a plurality of the flow termination records, or a collection of at least one of the flow creation records and at least one of the flow termination records.

10. The device of claim 1, where the flow table logic is further configured to analyze the plurality of entries in the flow table to identify one of the entries corresponding to a data flow for which no data unit has been received for at least a threshold amount of time; and
    where, when generating the flow termination records, the flow table logic is configured to generate one of the flow termination records, corresponding to the data flow, when no data unit, for the data flow, has been received for at least the threshold amount of time.

11. The device of claim 1, where the processing unit is further configured to, based on the correlated ones of the flow creation records and the flow termination records, at least one of:

create a history of which of the plurality of data flows existed at a particular point in time, determine when the plurality of data flows were created, determine when the plurality of data flows were terminated, identify sources and destinations associated with the plurality of data flows, determine how many data units or bytes were sent on the plurality of data flows, determine how many active ones of the plurality of data flows existed at a particular point in time, determine a flow creation rate for a particular source, determine an amount of bandwidth for an aggregation of at least two of the plurality of data flows, or determine a quantity of data units for an aggregation of at least two of the plurality of data flows.

12. The device of claim 1, further comprising:

a second processing unit configured to:

aggregate the flow creation records and the flow termination records from the processing unit, and send the aggregated flow creation records and flow termination records to a device external to the device for presentation to an operator.

13. A device, comprising:

a memory configured to store a flow table that stores, as a plurality of entries, statistics regarding a plurality of data flows;

flow table logic configured to generate records corresponding to ones of the plurality of data flows for which entries are created in the flow table or removed from the flow table;

sampling logic configured to:

select one of the plurality of data flows for sampling, and sample a plurality of initial data units for the one of the plurality of data flows when the one of the plurality of data flows is selected for sampling; and a processing unit configured to:

receive the records generated by the flow table logic, receive the initial data units sampled by the sampling logic, analyze the initial data units to generate analysis results, correlate the records and the analysis results associated with a same one of the plurality of data flows, store the correlated records and analysis results, and determine, based on the correlated ones of the records and the analysis results, a number of successful and a number of unsuccessful attempts to establish data flows by a particular source.

14. The device of claim 13, where, when generating the records, the flow table logic is configured to generate one of the records, corresponding to a particular data flow, when an entry, corresponding to the particular data flow, is created in the flow table.

15. The device of claim 13, where, when selecting one of the plurality of data flows for sampling, the sampling logic is configured to randomly select the one of the plurality of data flows for sampling.

16. The device of claim 13, where, when selecting one of the plurality of data flows for sampling, the sampling logic is configured to:

assign a weight value to the one of the plurality of data flows based on an attribute associated with the one of the plurality of data flows, and select the one of the plurality of data flows for sampling based on the assigned weight value.

17. The device of claim 13, where, when analyzing the initial data units, the processing unit is configured to perform deep packet inspection on the initial data units to generate the analysis results.

18. The device of claim 13, where the flow table logic is further configured to analyze the plurality of entries in the flow table to identify one of the entries corresponding to a data flow for which no data unit has been received for at least a threshold amount of time; and where, when generating the records, the flow table logic is configured to generate one of the records, corresponding to the data flow, when no data unit, for the data flow, has been received for at least the threshold amount of time.

19. The device of claim 13, further comprising:

one or more processing units separate from or including the processing unit, the one or more processing units being configured to, based on the generated records, at least one of:

create a history of which of the plurality of data flows existed at a particular point in time, determine when the plurality of data flows were created, determine when the plurality of data flows were terminated, identify sources and destinations associated with the plurality of data flows, determine how many data units or bytes were sent on the plurality of data flows, determine how many active ones of the plurality of data flows existed at a particular point in time, determine a flow creation rate for a particular source, determine an amount of bandwidth for an aggregation of at least two of the plurality of data flows, or determine a quantity of data units for an aggregation of at least two of the plurality of data flows.

20. A method performed by a device that includes a memory device and a processing unit, the method comprising:

receiving a data unit;

identifying a data flow associated with the data unit;

determining that the data flow is associated with no entry in a flow table stored within the memory device;

creating an entry in the flow table for the data flow when there is no entry in the flow table that is associated with the data flow;

generating a flow creation record, associated with the data flow, when the entry is created in the flow table;

selecting the data flow for sampling;

sampling a plurality of initial data units associated with the data flow;

sending the flow creation record and the initial data units to the processing unit;

analyzing, by the processing unit, the initial data units to generate analysis results;

associating, by the processing unit, the flow creation record with the analysis results within the memory device, and determining, based on the associated flow creation record and the analysis results, a number of successful and a number of unsuccessful attempts to establish data flows by a particular source.

21. The method of claim 20, where selecting the data flow for sampling includes:

assigning a weight value to the data flow based on an attribute associated with the data flow, and selecting the data flow for sampling based on the assigned weight value.

22. The method of claim 20, further comprising:

analyzing entries in the flow table to identify one of the entries corresponding to a particular data flow for which no data unit has been received for at least a threshold amount of time;

generating a flow termination record, corresponding to the particular data flow, when no data unit, for the particular data flow, has been received for at least the threshold amount of time; and sending the flow termination record to the processing unit.

23. A non-transitory computer-readable medium storing computer-executable instructions, the computer-executable instructions comprising:

one or more instructions to store, as a plurality of entries, statistics regarding a plurality of data flows;

one or more instructions to generate flow creation records corresponding to new data flows for which entries are created in the flow table;

one or more instructions to generate flow termination records corresponding to terminated data flows for which entries exist in the flow table;

one or more instructions to correlate ones of the flow creation records and the flow termination records associated with a same one of the plurality of data flows; and one or more instructions to determine, based on the correlated ones of the flow creation records and the flow termination records, a number of successful and a number of unsuccessful attempts to establish data flows by a particular source.

24. The non-transitory computer-readable medium of claim 23, where the computer-executable instructions further comprise:

one or more instructions to assign a weight value to the data flow based on an attribute associated with a particular data flow, and one or more instructions to select the particular data flow for sampling based on the assigned weight value.

* * * * *